United States Patent
Biskeborn et al.

(10) Patent No.: US 8,982,495 B2
(45) Date of Patent: Mar. 17, 2015

(54) MULTI-FORMAT READ DRIVE

(71) Applicant: International Business Machines Corporation, Armonk, NY (US)

(72) Inventors: Robert G. Biskeborn, Hollister, CA (US); Gary M. Decad, Palo Alto, CA (US); Jason Liang, Campbell, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/937,377

(22) Filed: Jul. 9, 2013

(65) Prior Publication Data

US 2015/0015985 A1    Jan. 15, 2015

(51) Int. Cl.
*G11B 15/12* (2006.01)
*G11B 5/008* (2006.01)

(52) U.S. Cl.
CPC ........ *G11B 5/00891* (2013.01); *G11B 5/00826* (2013.01)
USPC .............................................. 360/61; 360/63

(58) Field of Classification Search
None
See application file for complete search history.

(56) References Cited

U.S. PATENT DOCUMENTS

| | | | |
|---|---|---|---|
| 5,867,339 A | 2/1999 | Panish et al. | |
| 7,382,569 B2 | 6/2008 | Biskeborn et al. | |
| 7,787,203 B2 | 8/2010 | Biskeborn et al. | |
| 2001/0055180 A1 | 12/2001 | Saliba | |
| 2003/0026020 A1* | 2/2003 | Buckingham | 360/48 |
| 2009/0219648 A1 | 9/2009 | Jaquette | |
| 2009/0231756 A1 | 9/2009 | Koeppe | |
| 2010/0079896 A1* | 4/2010 | Biskeborn et al. | 360/71 |
| 2011/0102943 A1* | 5/2011 | Biskeborn et al. | 360/132 |

FOREIGN PATENT DOCUMENTS

| EP | 0 919 990 A2 | 6/1999 |
|---|---|---|
| WO | 2010/047679 A1 | 4/2010 |

OTHER PUBLICATIONS

Childers et al., "Six orders of magnitude in linear tape technology: The one-terabyte project," 2003 IBM, IBM Journal of Research and Development, vol. 47, No. 4, Jul. 2003, pp. 471-482.
U.S. Appl. No. 13/741,352, filed Jan. 14, 2013.
U.S. Appl. No. 13/757,388, filed Feb. 1, 2013.

* cited by examiner

*Primary Examiner* — Paul Huber
(74) *Attorney, Agent, or Firm* — Zilka-Kotab, PC (57) ABSTRACT

An apparatus according to one embodiment includes a plurality of modules configured to at least read data stored on a magnetic recording tape, each of the modules having an array of readers. One module is configured to read data on a magnetic recording tape which none of the other modules can read. An apparatus according to another embodiment includes a first module configured to at least read data stored on a magnetic recording tape in a first range of formats, and at least a second module configured to at least read data stored on a magnetic recording tape in at least a second range of formats. The first range of formats does not include a format that is in the second range of formats. All of the modules are aligned along a tape travel direction.

18 Claims, 10 Drawing Sheets

MULTI-FORMAT READ DRIVE

BACKGROUND

The present invention relates to data storage systems, and more particularly, this invention relates to a drive having multiple magnetic tape heads that are compatible with differing magnetic tape formats.

In magnetic storage systems, data is read from and written onto magnetic recording media utilizing magnetic transducers. Data is written on the magnetic recording media by moving a magnetic recording transducer to a position over the media where the data is to be stored. The magnetic recording transducer then generates a magnetic field, which encodes the data into the magnetic media. Data is read from the media by similarly positioning the magnetic read transducer and then sensing the magnetic field of the magnetic media. Read and write operations may be independently synchronized with the movement of the media to ensure that the data can be read from and written to the desired location on the media.

An important and continuing goal in the data storage industry is that of increasing the density of data stored on a medium. For tape storage systems, that goal has led to a progressive increase in the track and linear bit density on recording tape, and decrease in the thickness of the magnetic tape medium. However, the development of small footprint, higher performance tape drive systems has created various problems in the design of a tape head assembly for use in such systems.

In a tape drive system, magnetic tape is moved over the surface of the tape head at high speed. Usually the tape head is designed to minimize the spacing between the head and the tape. The spacing between the magnetic head and the magnetic tape is crucial and so goals in these systems are to have the recording gaps of the transducers, which are the source of the magnetic recording flux in near contact with the tape to effect writing sharp transitions, and to have the read elements in near contact with the tape to provide effective coupling of the magnetic field from the tape to the read elements.

BRIEF SUMMARY

An apparatus according to one embodiment includes a plurality of modules configured to at least read data stored on a magnetic recording tape, each of the modules having an array of readers. One module is configured to read data on a magnetic recording tape which none of the other modules can read.

An apparatus according to another embodiment includes a first module configured to at least read data stored on a magnetic recording tape in a first range of formats, and at least a second module configured to at least read data stored on a magnetic recording tape in at least a second range of formats. The first range of formats does not include a format that is in the second range of formats. All of the modules are aligned along a tape travel direction.

Any of these embodiments may be implemented in a magnetic data storage system such as a tape drive system, which may include a magnetic head, a drive mechanism for passing a magnetic medium (e.g., recording tape) over the magnetic head, and a controller electrically coupled to the magnetic head.

Other aspects and embodiments of the present invention will become apparent from the following detailed description, which, when taken in conjunction with the drawings, illustrate by way of example the principles of the invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of magnetic storage systems, as well as operation and/or component parts thereof. Various embodiments described herein include a system which is compatible with data stored in multiple (e.g., at least three) formats. As a result, inherent problems with conventional products, including inaccessible data, quickly outdated magnetic heads, high maintenance costs, etc., are successfully overcome.

In one general embodiment, an apparatus includes a plurality of modules configured to at least read data stored on a magnetic recording tape, each of the modules having an array of readers. One module is configured to read data on a magnetic recording tape which none of the other modules can read.

In another general embodiment, an apparatus includes a first module configured to at least read data stored on a magnetic recording tape in a first range of formats, and at least a second module configured to at least read data stored on a magnetic recording tape in at least a second range of formats. The first range of formats does not include a format that is in the second range of formats. All of the modules are aligned along a tape travel direction.

Figure 1A:
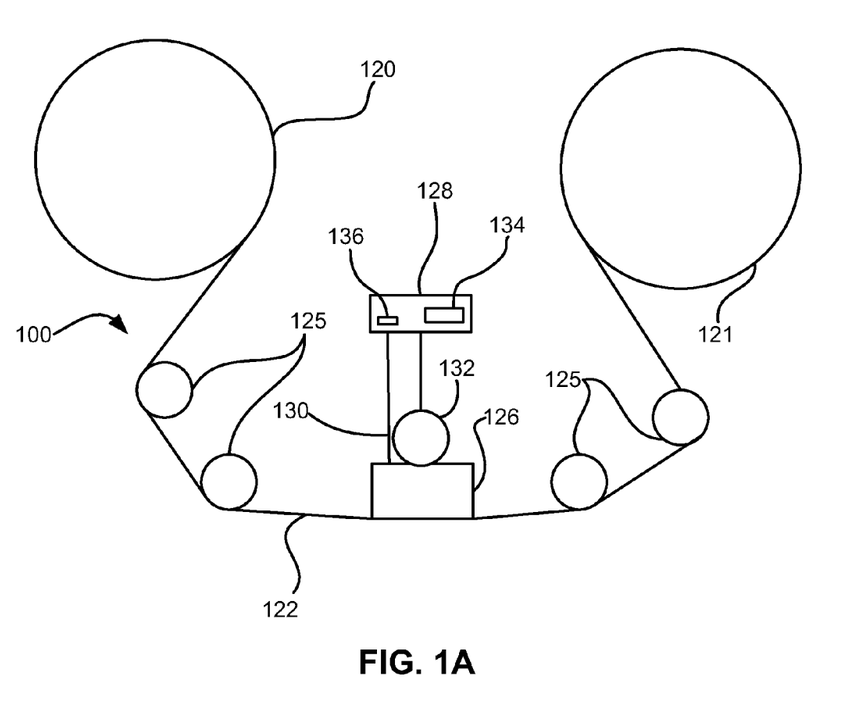
FIG. 1A is a schematic diagram of a simplified tape drive system according to one embodiment.

FIG. 1A illustrates a simplified tape drive 100 of a tape-based data storage system, which may be employed in the context of the present invention. While one specific implementation of a tape drive is shown in FIG. 1A, it should be noted that the embodiments described herein may be implemented in the context of any type of tape drive system.

As shown, a tape supply cartridge 120 and a take-up reel 121 are provided to support a tape 122. One or more of the reels may form part of a removable cartridge and are not necessarily part of the system 100. The tape drive, such as that illustrated in FIG. 1A, may further include drive motor(s) to drive the tape supply cartridge 120 and the take-up reel 121 to move the tape 122 over a tape head 126 of any type. Such head may include an array of readers, writers, or both in one or more modules.

Guides 125 guide the tape 122 across the tape head 126. Such tape head 126 is in turn coupled to a controller 128 via a cable 130. The controller 128, may be or include a processor and/or any logic for controlling any subsystem of the drive 100. For example, the controller 128 typically controls head functions such as servo following, data writing, data reading, etc. The controller 128 may operate under logic known in the art, as well as any logic disclosed herein. The controller 128 may be coupled to a memory 136 of any known type, which may store instructions executable by the controller 128. Moreover, the controller 128 may be configured and/or programmable to perform or control some or all of the methodology presented herein. Thus, the controller may be considered configured to perform various operations by way of logic programmed into a chip; software, firmware, or other instructions being available to a processor; etc. and combinations thereof.

The cable 130 may include read/write circuits to transmit data to the head 126 to be recorded on the tape 122 and to receive data read by the head 126 from the tape 122. An actuator 132 controls position of the head 126 relative to the tape 122.

An interface 134 may also be provided for communication between the tape drive 100 and a host (integral or external) to send and receive the data and for controlling the operation of the tape drive 100 and communicating the status of the tape drive 100 to the host, all as will be understood by those of skill in the art.

Figure 1B:
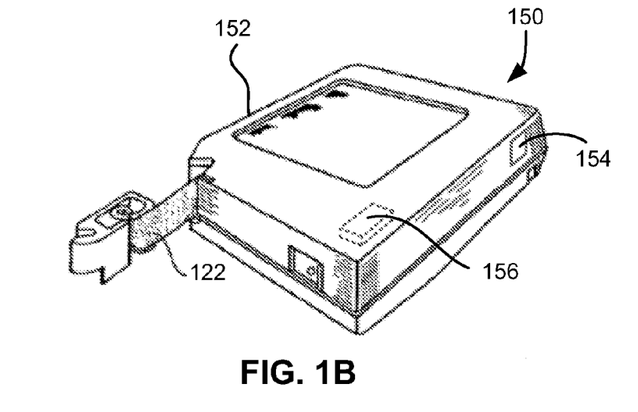
FIG. 1B is a schematic diagram of a tape cartridge according to one embodiment.

FIG. 1B illustrates an exemplary tape cartridge 150 according to one embodiment. Such tape cartridge 150 may be used with a system such as that shown in FIG. 1A. As shown, the tape cartridge 150 includes a housing 152, a tape 122 in the housing 152, and a nonvolatile memory 156 coupled to the housing 152. In some approaches, the nonvolatile memory 156 may be embedded inside the housing 152, as shown in FIG. 1B. In more approaches, the nonvolatile memory 156 may be attached to the inside or outside of the housing 152 without modification of the housing 152. For example, the nonvolatile memory may be embedded in a self-adhesive label 154. In one preferred embodiment, the nonvolatile memory 156 may be a Flash memory device, ROM device, etc., embedded into or coupled to the inside or outside of the tape cartridge 150. The nonvolatile memory is accessible by the tape drive and the tape operating software (the driver software), and/or other device.

Figure 2:
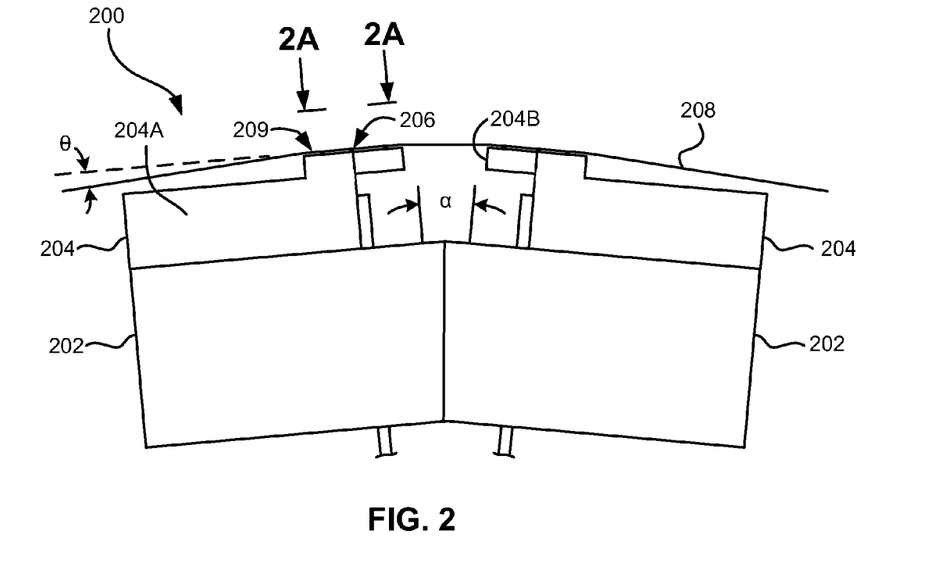
FIG. 2 illustrates a side view of a flat-lapped, bi-directional, two-module magnetic tape head according to one embodiment.

By way of example, FIG. 2 illustrates a side view of a flat-lapped, bi-directional, two-module magnetic tape head 200 which may be implemented in the context of the present invention. As shown, the head includes a pair of bases 202, each equipped with a module 204, and fixed at a small angle α with respect to each other. The bases may be "U-beams" that are adhesively coupled together. Each module 204 includes a substrate 204A and a closure 204B with a thin film portion, commonly referred to as a "gap" in which the readers and/or writers 206 are formed. In use, a tape 208 is moved over the modules 204 along a media (tape) bearing surface 209 in the manner shown for reading and writing data on the tape 208 using the readers and writers. The wrap angle θ of the tape 208 at edges going onto and exiting the flat media support surfaces 209 are usually between about 0.1 degree and about 5 degrees.

The substrates 204A are typically constructed of a wear resistant material, such as a ceramic. The closures 204B made of the same or similar ceramic as the substrates 204A.

The readers and writers may be arranged in a piggyback or merged configuration. An illustrative piggybacked configuration comprises a (magnetically inductive) writer transducer on top of (or below) a (magnetically shielded) reader transducer (e.g., a magnetoresistive reader, etc.), wherein the poles of the writer and the shields of the reader are generally separated. An illustrative merged configuration comprises one reader shield in the same physical layer as one writer pole (hence, "merged"). The readers and writers may also be arranged in an interleaved configuration. Alternatively, each array of channels may be readers or writers only. Any of these arrays may contain one or more servo track readers for reading servo data on the medium.

Figure 2A:
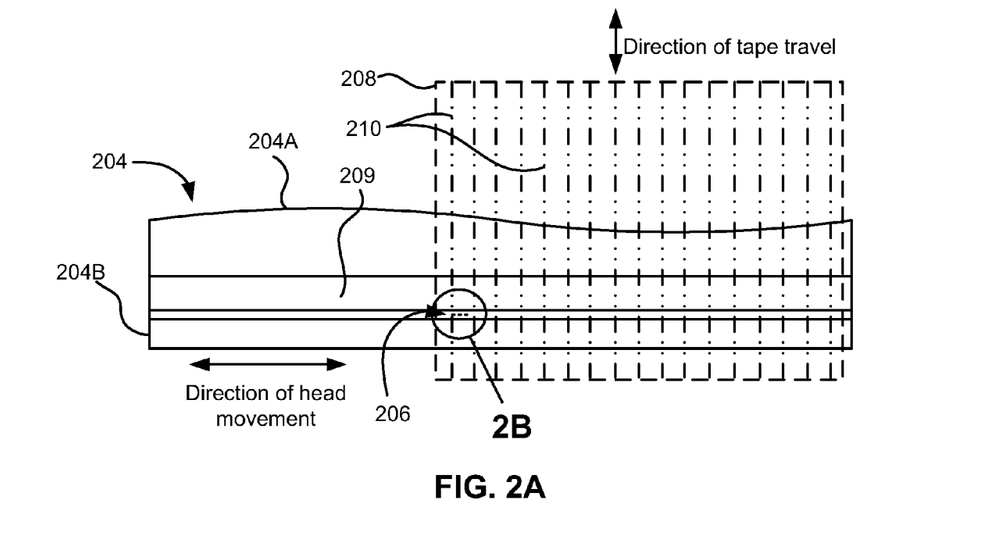
FIG. 2A is a tape bearing surface view taken from Line 2A of FIG. 2.

FIG. 2A illustrates the tape bearing surface 209 of one of the modules 204 taken from Line 2A of FIG. 2. A representative tape 208 is shown in dashed lines. The module 204 is preferably long enough to be able to support the tape as the head steps between data bands.

In this example, the tape 208 includes 4 to 22 data bands, e.g., with 8 data bands and 9 servo tracks 210, as shown in FIG. 2A on a one-half inch wide tape 208. The data bands are defined between servo tracks 210. Each data band may include a number of data tracks, for example 1024 data tracks (not shown). During read/write operations, the readers and/or writers 206 are positioned to specific track positions within one of the data bands. Outer readers, sometimes called servo readers, read the servo tracks 210. The servo signals are in turn used to keep the readers and/or writers 206 aligned with a particular set of tracks during the read/write operations.

Figure 2B:
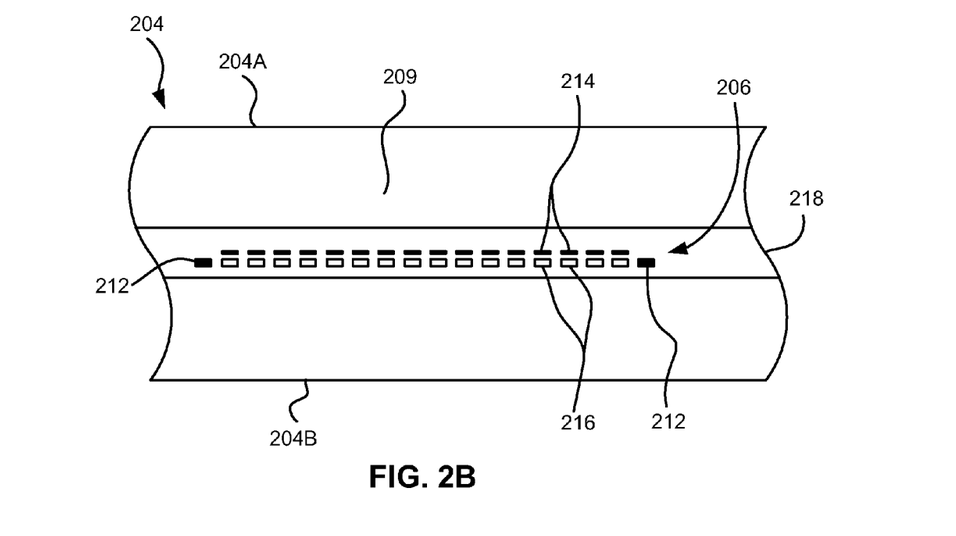
FIG. 2B is a detailed view taken from Circle 2B of FIG. 2A.

FIG. 2B depicts a plurality of readers and/or writers 206 formed in a gap 218 on the module 204 in Circle 2B of FIG. 2A. As shown, the array of readers and writers 206 includes, for example, 16 writers 214, 16 readers 216 and two servo readers 212, though the number of elements may vary. Illustrative embodiments include 8, 16, 32, 40, and 64 active readers and/or writers 206 per array, and alternatively interleaved designs having odd numbers of reader or writers such as 17, 25, 33, etc. An illustrative embodiment includes 32 readers per array and/or 32 writers per array, where the actual number of transducer elements could be greater, e.g., 33, 34, etc. This allows the tape to travel more slowly, thereby reducing speed-induced tracking and mechanical difficulties and/or execute fewer "wraps" to fill or read the tape. While the readers and writers may be arranged in a piggyback configuration as shown in FIG. 2B, the readers 216 and writers 214 may also be arranged in an interleaved configuration. Alternatively, each array of readers and/or writers 206 may be readers or writers only, and the arrays may contain one or more servo readers 212. As noted by considering FIGS. 2 and 2A-B together, each module 204 may include a complementary set of readers and/or writers 206 for such things as bi-directional reading and writing, read-while-write capability, backward compatibility, etc.

Figure 2C:
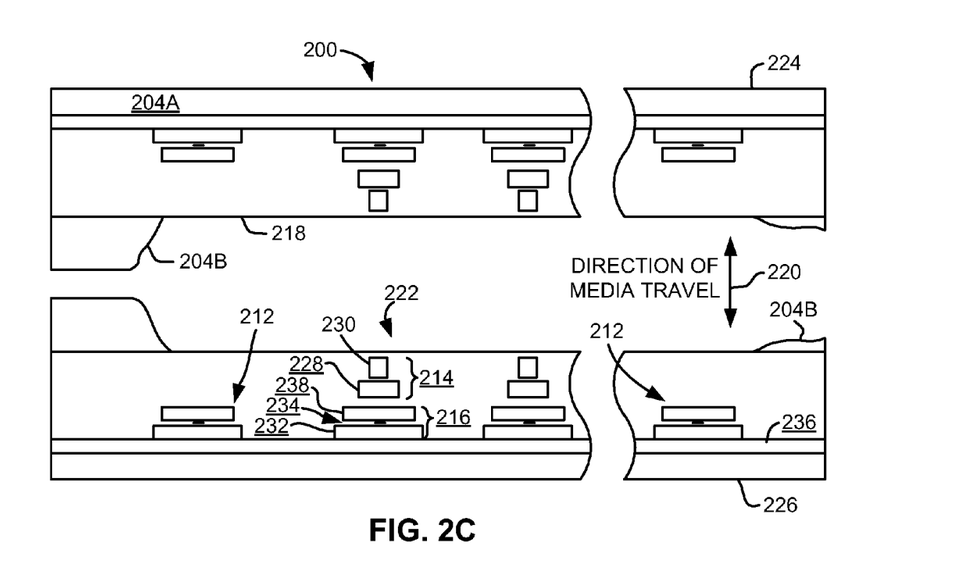
FIG. 2C is a detailed view of a partial tape bearing surface of a pair of modules.

FIG. 2C shows a partial tape bearing surface view of complimentary modules of a magnetic tape head 200 according to one embodiment. In this embodiment, each module has a plurality of read/write (R/W) pairs in a piggyback configuration formed on a common substrate 204A and an optional electrically insulative layer 236. The writers, exemplified by the write head 214 and the readers, exemplified by the read head 216, are aligned parallel to an intended direction of travel of a tape medium thereacross to form an R/W pair, exemplified by the R/W pair 222. Note that the intended direction of tape travel is sometimes referred to herein as the direction of tape travel, and such terms may be used interchangeable. Such direction of tape travel may be inferred from the design of the system, e.g., by examining the guides; observing the actual direction of tape travel relative to the reference point; etc. Moreover, in a system operable for bi-direction reading and/or writing, the direction of tape travel in both directions is typically parallel and thus both directions may be considered equivalent to each other.

Several R/W pairs 222 may be present, such as 8, 16, 32 pairs, etc. The R/W pairs 222 as shown are linearly aligned in a direction generally perpendicular to a direction of tape travel thereacross. However, the pairs may also be aligned diagonally, etc. Servo readers 212 are positioned on the outside of the array of R/W pairs, the function of which is well known.

Generally, the magnetic tape medium moves in either a forward or reverse direction as indicated by arrow 220. The magnetic tape medium and head assembly 200 operate in a transducing relationship in the manner well-known in the art. The piggybacked MR head assembly 200 includes two thin-film modules 224 and 226 of generally identical construction.

Modules 224 and 226 are joined together with a space present between closures 204B thereof (partially shown) to form a single physical unit to provide read-while-write capability by activating the writer of the leading module and reader of the trailing module aligned with the writer of the leading module parallel to the direction of tape travel relative thereto. When a module 224, 226 of a piggyback head 200 is constructed, layers are formed in the gap 218 created above an electrically conductive substrate 204A (partially shown), e.g., of AlTiC, in generally the following order for the R/W pairs 222: an insulating layer 236, a first shield 232 typically of an iron alloy such as NiFe (–), CZT or Al—Fe—Si (Sendust), a sensor 234 for sensing a data track on a magnetic medium, a second shield 238 typically of a nickel-iron alloy (e.g., ~80/20 at % NiFe, also known as permalloy), first and second writer pole tips 228, 230, and a coil (not shown). The sensor may be of any known type, including those based on magnetoresistance (MR), giant magnetoresistance (GMR), anisotropic magnetoresistance (AMR), tunneling magnetoresistance (TMR), etc.

The first and second writer poles 228, 230 may be fabricated from high magnetic moment materials such as ~45/55 NiFe. Note that these materials are provided by way of example only, and other materials may be used. Additional layers such as insulation between the shields and/or pole tips and an insulation layer surrounding the sensor may be present. Illustrative materials for the insulation include alumina and other oxides, insulative polymers, etc.

Figure 3:
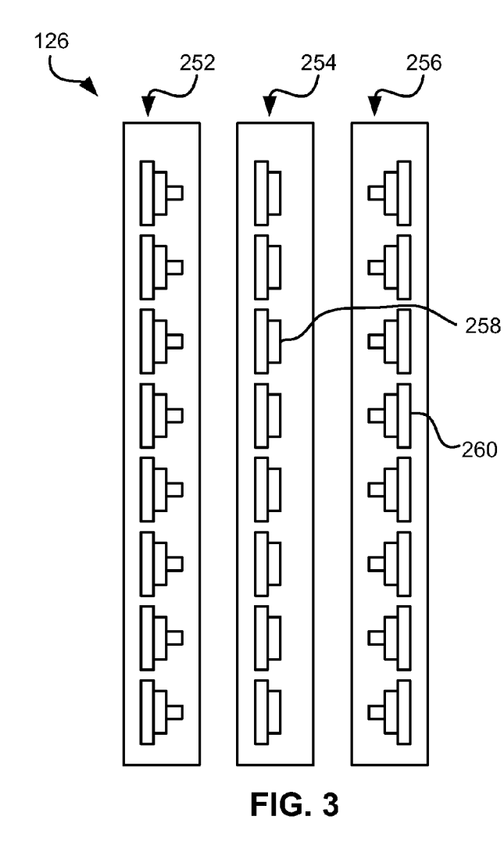
FIG. 3 is a partial tape bearing surface view of a magnetic head having a write-read-write configuration.
Figure 4:
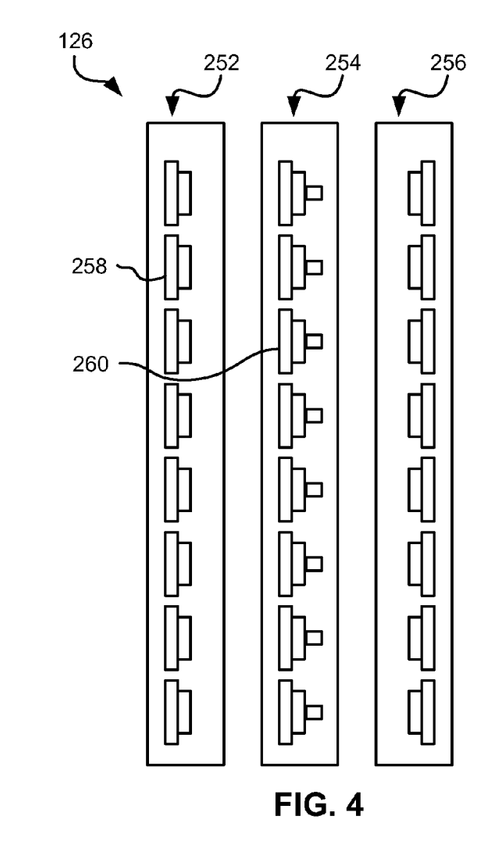
FIG. 4 is a partial tape bearing surface view of a magnetic head having a read-write-read configuration.

The configuration of the tape head 126 according to one embodiment includes multiple modules, preferably three or more. In a write-read-write (W-R-W) head, outer modules for writing flank one or more inner modules for reading. Referring to FIG. 3, depicting a W-R-W configuration, the outer modules 252, 256 each include one or more arrays of writers 260. The inner module 254 of FIG. 3 includes one or more arrays of readers 258 in a similar configuration. Variations of a multi-module head include a R-W-R head (FIG. 4), a R-R-W head, a W-W-R head, etc. In yet other variations, one or more of the modules may have read/write pairs of transducers. Moreover, more than three modules may be present. In further approaches, two outer modules may flank two or more inner modules, e.g., in a W-R-R-W, a R-W-W-R arrangement, etc. For simplicity, a W-R-W head is used primarily herein to exemplify embodiments of the present invention. One skilled in the art apprised with the teachings herein will appreciate how permutations of the present invention would apply to configurations other than a W-R-W configuration.

Figure 5:
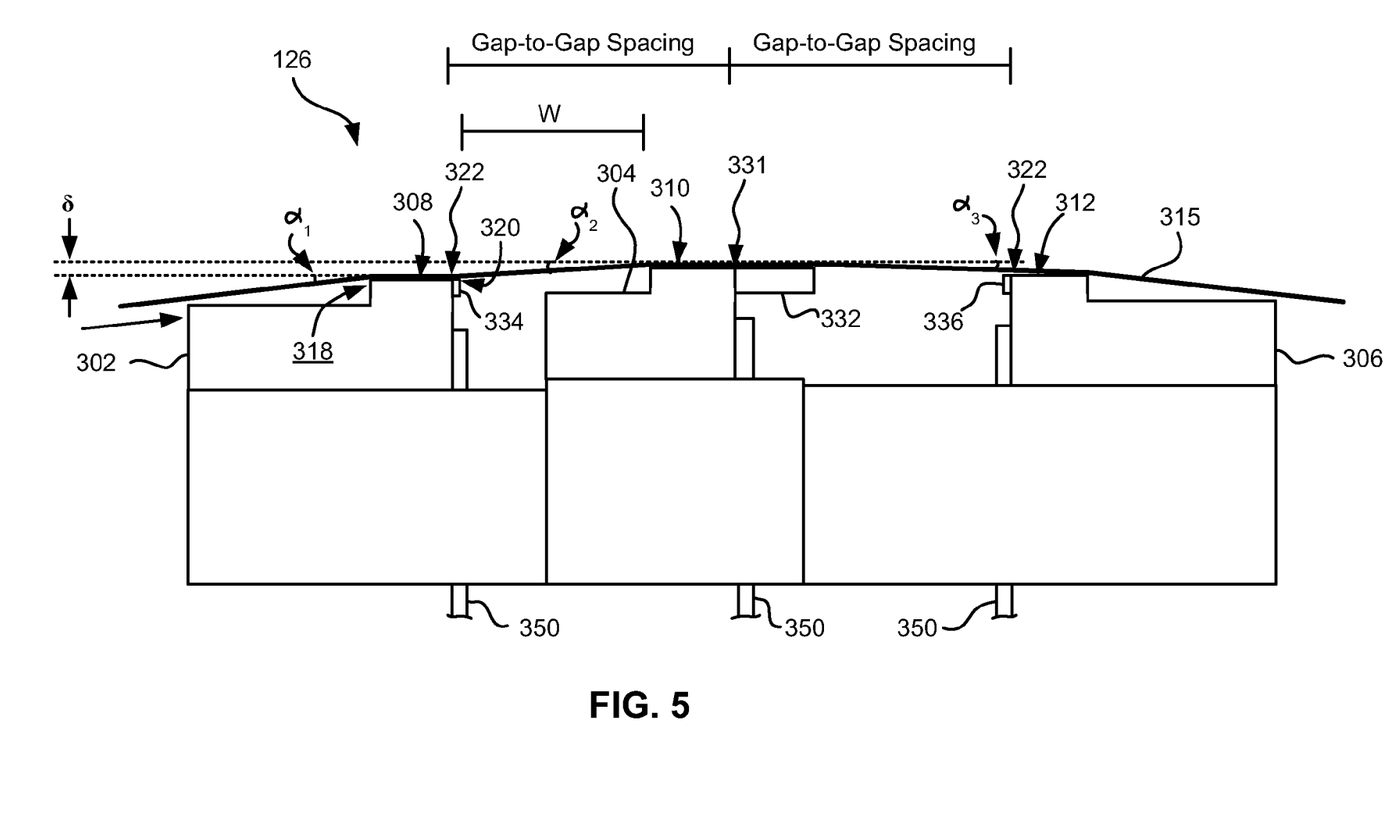
FIG. 5 is a side view of a magnetic tape head with three modules according to one embodiment where the modules all generally lie along about parallel planes.

FIG. 5 illustrates a magnetic head 126 according to one embodiment of the present invention that includes first, second and third modules 302, 304, 306 each having a tape bearing surface 308, 310, 312 respectively, which may be flat, contoured, etc. Note that while the term "tape bearing surface" appears to imply that the surface facing the tape 315 is in physical contact with the tape bearing surface, this is not necessarily the case. Rather, only a portion of the tape may be in contact with the tape bearing surface, constantly or intermittently, with other portions of the tape riding (or "flying") above the tape bearing surface on a layer of air, sometimes referred to as an "air bearing". The first module 302 will be referred to as the "leading" module as it is the first module encountered by the tape in a three module design for tape moving in the indicated direction. The third module 306 will be referred to as the "trailing" module. The trailing module follows the middle module and is the last module seen by the tape in a three module design. The leading and trailing modules 302, 306 are referred to collectively as outer modules. Also note that the outer modules 302, 306 will alternate as leading modules, depending on the direction of travel of the tape 315.

Figure 6:
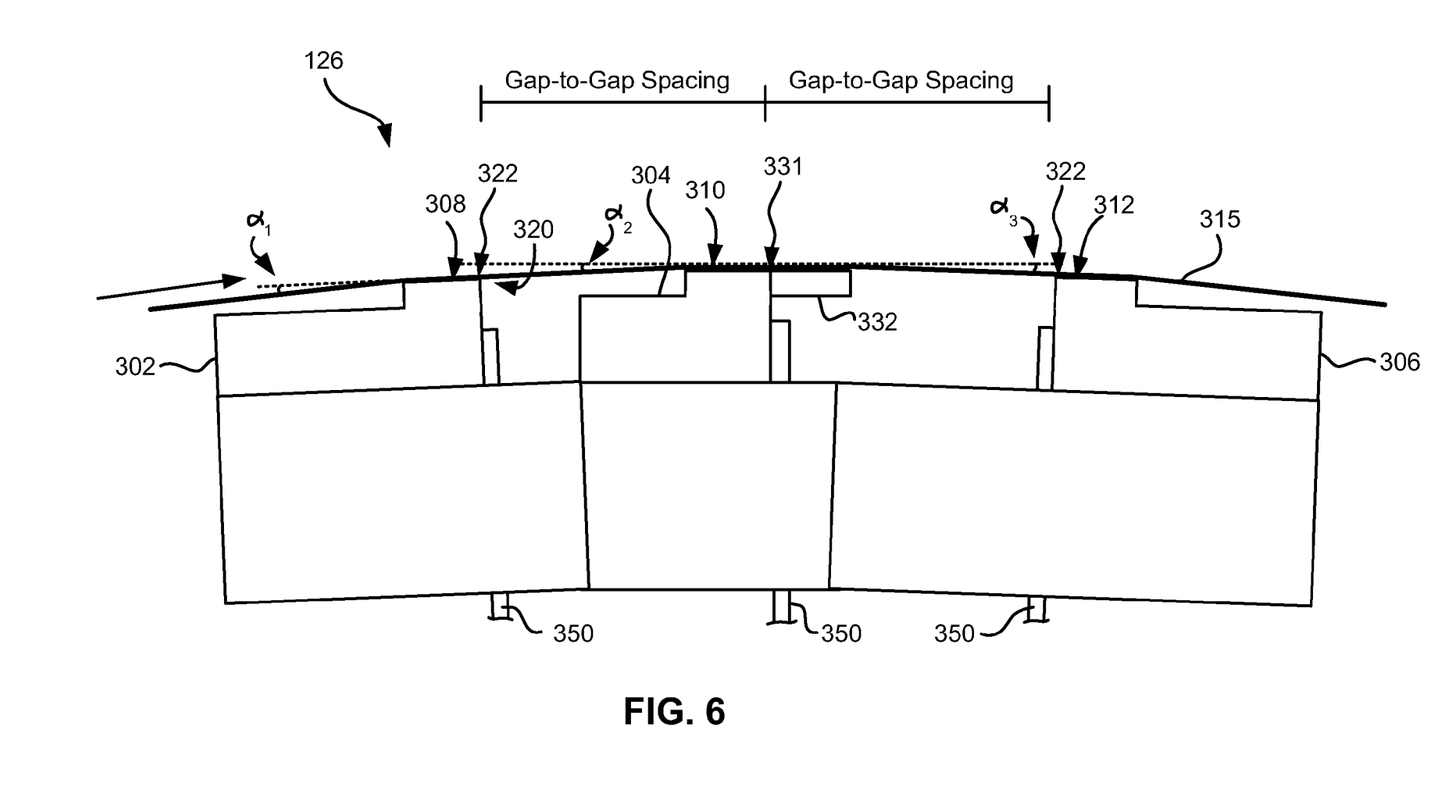
FIG. 6 is a side view of a magnetic tape head with three modules in a tangent (angled) configuration.

In one embodiment, the tape bearing surfaces 308, 310, 312 of the first, second and third modules 302, 304, 306 lie on about parallel planes (which is meant to include parallel and nearly parallel planes, e.g., between parallel and tangential as in FIG. 6), and the tape bearing surface 310 of the second module 304 is above the tape bearing surfaces 308, 312 of the first and third modules 302, 306. As described below, this has the effect of creating the desired wrap angle $\alpha_2$ of the tape relative to the tape bearing surface 310 of the second module 304.

Where the tape bearing surfaces 308, 310, 312 lie along parallel or nearly parallel yet offset planes, intuitively, the tape should peel off of the tape bearing surface 308 of the leading module 302. However, the vacuum created by the skiving edge 318 of the leading module 302 has been found by experimentation to be sufficient to keep the tape adhered to the tape bearing surface 308 of the leading module 302. The trailing edge 320 of the leading module 302 (the end from which the tape leaves the leading module 302) is the approximate reference point which defines the wrap angle $\alpha_2$ over the tape bearing surface 310 of the second module 304. The tape stays in close proximity to the tape bearing surface until close to the trailing edge 320 of the leading module 302. Accordingly, read and/or write elements 322 may be located near the trailing edges of the outer modules 302, 306. These embodiments are particularly adapted for write-read-write applications.

A benefit of this and other embodiments described herein is that, because the outer modules 302, 306 are fixed at a determined offset from the second module 304, the inner wrap angle $\alpha_2$ is fixed when the modules 302, 304, 306 are coupled together or are otherwise fixed into a head. The inner wrap angle $\alpha_2$ is approximately $\tan^{-1}(\delta/W)$ where $\delta$ is the height difference between the planes of the tape bearing surfaces 308, 310 and W is the width between the opposing ends of the tape bearing surfaces 308, 310. An illustrative inner wrap angle $\alpha_2$ is in a range of about 0.5° to about 1.1°, though can be any angle required by the design.

Beneficially, the inner wrap angle $\alpha_2$ on the side of the module 304 receiving the tape (leading edge) will be larger than the inner wrap angle $\alpha_3$ on the trailing edge, as the tape 315 rides above the trailing module 306. This difference is generally beneficial as a smaller $\alpha_3$ tends to oppose what has heretofore been a steeper exiting effective wrap angle.

Note that the tape bearing surfaces 308, 312 of the outer modules 302, 306 are positioned to achieve a negative wrap angle at the trailing edge 320 of the leading module 302. This is generally beneficial in helping to reduce friction due to contact with the trailing edge 320, provided that proper consideration is given to the location of the crowbar region that forms in the tape where it peels off the head. This negative wrap angle also reduces flutter and scrubbing damage to the elements on the leading module 302. Further, at the trailing module 306, the tape 315 flies over the tape bearing surface 312 so there is virtually no wear on the elements when tape is moving in this direction. Particularly, the tape 315 entrains air and so will not significantly ride on the tape bearing surface 312 of the third module 306 (some contact may occur). This is permissible, because the leading module 302 is writing while the trailing module 306 is idle.

Writing and reading functions are performed by different modules at any given time. In one embodiment, the second module 304 includes a plurality of data and optional servo readers 331 and no writers. The first and third modules 302, 306 include a plurality of writers 322 and no readers, with the exception that the outer modules 302, 306 may include optional servo readers. The servo readers may be used to position the head during reading and/or writing operations. The servo reader(s) on each module are typically located towards the end of the array of readers or writers.

By having only readers or side by side writers and servo readers in the gap between the substrate and closure, the gap length can be substantially reduced. Typical heads have piggybacked readers and writers, where the writer is formed above each reader. A typical gap is 25-35 microns. However, irregularities on the tape may tend to droop into the gap and create gap erosion. Thus, the smaller the gap is the better. The smaller gap enabled herein exhibits fewer wear related problems.

In some embodiments, the second module 304 has a closure, while the first and third modules 302, 306 do not have a closure. Where there is no closure, preferably a hard coating is added to the module. One preferred coating is diamond-like carbon (DLC).

In the embodiment shown in FIG. 5, the first, second, and third modules 302, 304, 306 each have a closure 332, 334, 336, which extends the tape bearing surface of the associated module, thereby effectively positioning the read/write elements away from the edge of the tape bearing surface. The closure 332 on the second module 304 can be a ceramic closure of a type typically found on tape heads. The closures 334, 336 of the first and third modules 302, 306, however, may be shorter than the closure 332 of the second module 304 as measured parallel to a direction of tape travel over the respective module. This enables positioning the modules closer together. One way to produce shorter closures 334, 336 is to lap the standard ceramic closures of the second module 304 an additional amount. Another way is to plate or deposit thin film closures above the elements during thin film processing. For example, a thin film closure of a hard material such as Sendust or nickel-iron alloy (e.g., 45/55) can be formed on the module.

With reduced-thickness ceramic or thin film closures 334, 336 or no closures on the outer modules 302, 306, the write-to-read gap spacing can be reduced to less than about 1 mm, e.g., about 0.75 mm, or 50% less than standard LTO tape head spacing. The open space between the modules 302, 304, 306 can still be set to approximately 0.5 to 0.6 mm, which in some embodiments is ideal for stabilizing tape motion over the second module 304.

Depending on tape tension and stiffness, it may be desirable to angle the tape bearing surfaces of the outer modules relative to the tape bearing surface of the second module. FIG. 6 illustrates an embodiment where the modules 302, 304, 306 are in a tangent or nearly tangent (angled) configuration. Particularly, the tape bearing surfaces of the outer modules 302, 306 are about parallel to the tape at the desired wrap angle $\alpha_2$ of the second module 304. In other words, the planes of the tape bearing surfaces 308, 312 of the outer modules 302, 306 are oriented at about the desired wrap angle $\alpha_2$ of the tape 315 relative to the second module 304. The tape will also pop off of the trailing module 306 in this embodiment, thereby reducing wear on the elements in the trailing module 306. These embodiments are particularly useful for write-read-write applications. Additional aspects of these embodiments are similar to those given above.

Typically, the tape wrap angles may be set about midway between the embodiments shown in FIGS. 5 and 6.

Figure 7:
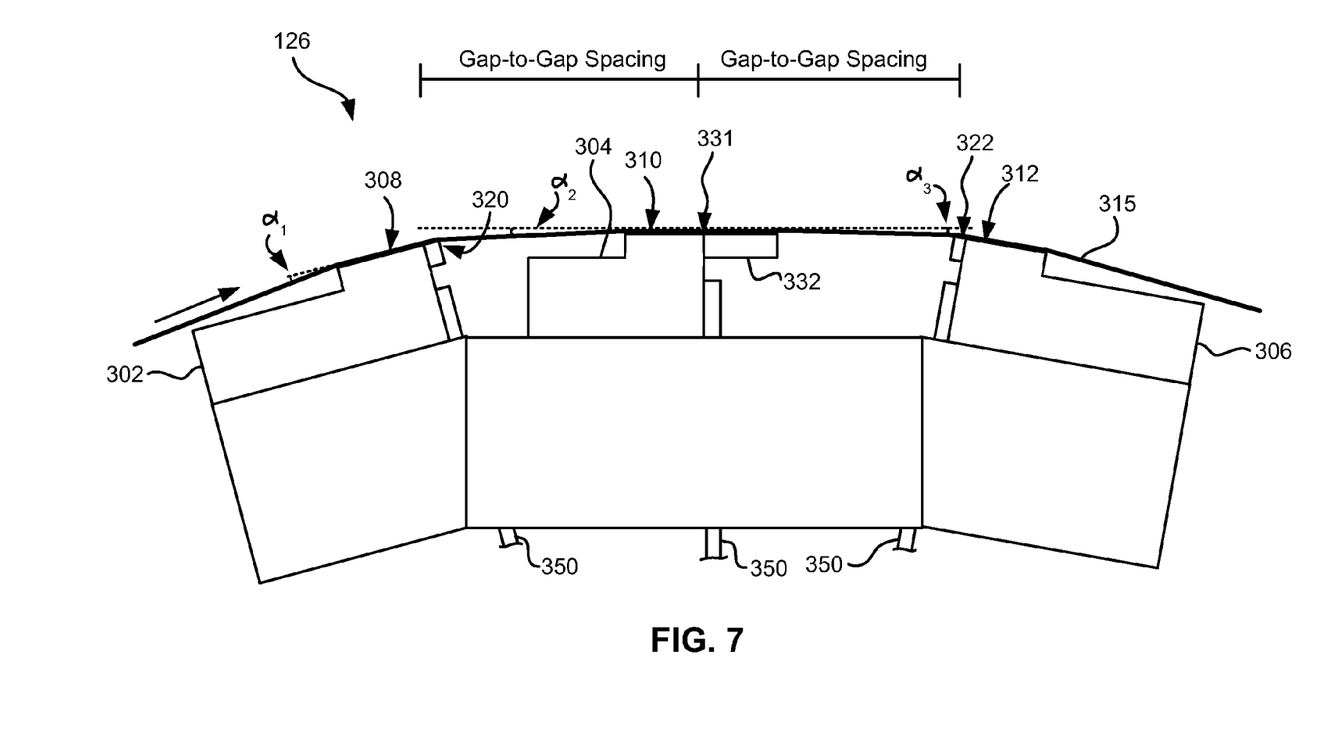
FIG. 7 is a side view of a magnetic tape head with three modules in an overwrap configuration.

FIG. 7 illustrates an embodiment where the modules 302, 304, 306 are in an overwrap configuration. Particularly, the tape bearing surfaces 308, 312 of the outer modules 302, 306 are angled slightly more than the tape 315 when set at the desired wrap angle $\alpha_2$ relative to the second module 304. In this embodiment, the tape does not pop off of the trailing module, allowing it to be used for writing or reading. Accordingly, the leading and middle modules can both perform reading and/or writing functions while the trailing module can read any just-written data. Thus, these embodiments are preferred for write-read-write, read-write-read, and write-write-read applications. In the latter embodiments, closures should be wider than the tape canopies for ensuring read capability. The wider closures may require a wider gap-to-gap separation. Therefore a preferred embodiment has a write-read-write configuration, which may use shortened closures that thus allow closer gap-to-gap separation.

Additional aspects of the embodiments shown in FIGS. 6 and 7 are similar to those given above.

A 32 channel version of a multi-module head 126 may use cables 350 having leads on the same or smaller pitch as current 16 channel piggyback LTO modules, or alternatively the connections on the module may be organ-keyboarded for a 50% reduction in cable span. Over-under, writing pair unshielded cables may be used for the writers, which may have integrated servo readers.

The outer wrap angles $\alpha_1$ may be set in the drive, such as by guides of any type known in the art, such as adjustable rollers, slides, etc. For example, rollers having an offset axis may be used to set the wrap angles. The offset axis creates an orbital arc of rotation, allowing precise alignment of the wrap angle $\alpha_1$.

To assemble any of the embodiments described above, conventional u-beam assembly can be used. Accordingly, the mass of the resultant head may be maintained or even reduced relative to heads of previous generations. In other approaches, the modules may be constructed as a unitary body. Those skilled in the art, armed with the present teachings, will appreciate that other known methods of manufacturing such heads may be adapted for use in constructing such heads.

As more and more data is stored digitally, the number of formats, e.g., product generations, company platforms, track pitches, etc., in which the data is stored has increased. As a result, there is a growing concern about whether stored data can be retrieved and processed by a given magnetic head. For example, data written to a magnetic tape having one format may not be accessible to a magnetic head constructed to comply with a different format. This is particularly true for tape drives intended for use in archiving large amounts of data.

In sharp contrast, various embodiments described herein include a structure which is compatible with data stored in multiple (e.g., at least three) formats. Moreover, such embodiments may be used in conjunction with any of the approaches described above with reference to FIGS. 1-7. As a result, the inherent problems with conventional products, including inaccessible data, quickly outdated magnetic heads, high maintenance costs, etc., are successfully overcome.

Figure 8:
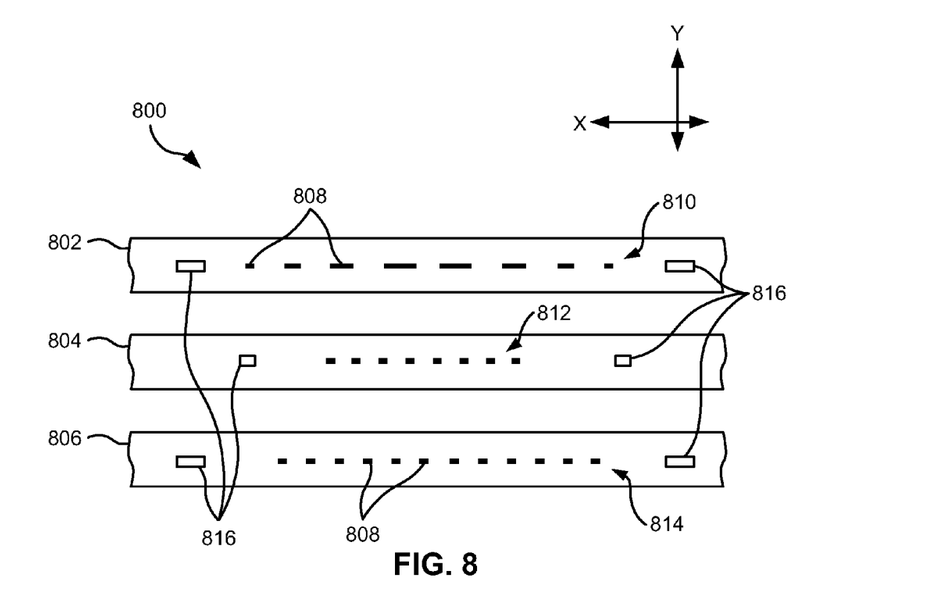
FIG. 8 is a partial top-down view of an apparatus having three modules according to one embodiment.

FIG. 8 depicts an apparatus 800 in accordance with one embodiment, for reading data stored in various formats. As an option, the present apparatus 800 may be implemented in conjunction with features from any other embodiment listed herein, such as those described with reference to the other FIGS. Of course, however, such apparatus 800 and others presented herein may be used in various applications and/or in permutations which may or may not be specifically described in the illustrative embodiments listed herein. Further, the apparatus 800 presented herein may be used in any desired environment.

With reference now to FIG. 8, the apparatus 800 includes a plurality of modules 802, 804, 806, each of which includes an array 810, 812, 814 of readers 808 respectfully, in addition to servo readers 816. Thus the apparatus 800 is preferably configured to at least read data stored on a magnetic recording tape. In some approaches, the apparatus 800 may not be configured to write. For example, the plurality of modules 802, 804, 806 may have no write capability, e.g., the modules 802, 804, 806 may not include any write transducers; the write transducers are not connected to write channels; the write transducers are not coupled to a cable; the write transducers are otherwise inoperative in the drive; etc. Thus, depending on the embodiment, the apparatus 800 may be operative for readback operations only. However, in other approaches, one or more of the modules 802, 804, 806 may include write transducers, e.g., of any type known in the art, and thereby may have writing functionality.

Looking to the apparatus 800, at least one of the plurality of modules 802, 804, 806 may preferably be configured to read data on a magnetic recording tape (not shown) which neither of the other two modules are able to read. As described above, data may be stored on various magnetic recording tapes having different formats, which includes generational formats, data formats, tape layout formats, etc. Thus, modules may be configured to read data corresponding to certain formats, depending on the desired embodiment as will soon become apparent. Moreover, tape cartridges may be used to store magnetic recording tapes, and may also have various formats, as will be discussed in further detail below.

With continued reference to FIG. 8, the plurality of modules 802, 804, 806 may include a first module 802, configured to read data in a first range of formats. In a further approach, a second module 804 may be configured to read data in a second range of formats, while a third module 806 may be configured to read data in a third range of formats. With reference to the present description, a range of formats may include one (a range of 1) or more formats, depending on the embodiment. Moreover, the third range of formats preferably encompasses at least one format not included in either of the first and/or second ranges of formats, while the second range of formats may encompass at least one format not included in the first range of formats. Thus, in a preferred approach, each of the ranges of formats may include at least one format not included in either of the other two ranges of formats. As a result, the apparatus may be able to read at least three different data formats.

In various approaches, the formats of a given range may be defined by track widths, linear density, number of channels, number of tracks, number of data bands, type of tape, data track pitches, type of reader (e.g., AMR, GMR, TMR, etc.), servo track format, etc. Thus, according to different approaches, one module may include TMR data sensors, while another module may include at least one of AMR and/or GMR data sensors and/or combinations thereof, depending on the desired embodiment.

According to one approach, a module having readers of different sizes and/or having different spacing therebetween may enable the module to read data in a range of formats. As mentioned immediately above, formats of a given range may be defined by track widths, number of tracks, track positions, etc. Thus, the different sizes and/or spacing between the readers of a module preferably may enable the readers to coincide with the differing formats.

Looking again to FIG. 8, the widths of the readers 808 measured in a cross track direction X, have different values within each of the modules 802, 804, 806. Moreover, as illustrated, the cross-track widths of readers closer to the middle (e.g., the center reader in a cross track direction X) of the arrays 810, 812, 814 on each of the modules 802, 804, 806 respectively, may be greater than the cross-track widths of the readers relatively farther from the middle of the arrays 810, 812, 814. As a result, the readers farther from the middle of the respective arrays having a smaller cross-track width may be used to mitigate tape lateral expansion, as described in U.S. Pat. No. 7,382,569, issued on Jun. 3, 2008, which is herein incorporated by reference. Moreover, although FIG. 8 illustrates each of the modules 802, 804, 806 having readers with differing cross-track widths, none, at least one, at least two, a majority, etc. of the modules of a given apparatus may incorporate readers having different widths in the cross track direction X.

In a similar approach, at least one module of the apparatus 800 may have at least one servo reader or servo reader pair that is configured differently (e.g., having different locations/positions, sizes, center-to-center pitches, etc.) than a servo reader of at least another module. Looking to module 804, the corresponding servo readers 816 have a smaller width in the cross track direction X than those of the other two modules 802, 806. Additionally, the servo readers 816 of module 804 are positioned closer to each other in the cross track direction X than those of the other two modules 802, 806. It follows that, in different approaches, the modules 802, 804, 806 may also be able to access the servo tracks corresponding to various magnetic recording tapes having different formats.

With continued reference to FIG. 8, although each of the modules 802, 804, 806 may be generally aligned along a tape travel direction Y, according to a preferred approach, the readers 808 of at least a first of the modules may be misaligned with a majority of readers 808 of at least a second of the modules in the tape travel direction Y. In some approaches, the readers 808 of each of the modules 802, 804, 806 may be misaligned with a majority of readers 808 of each of the other modules 802, 804, 806 in the tape travel direction Y. With reference to the present description, "a majority" may be defined as greater than 50% of the items to which it refers. This allows the readers of the modules to cover a wide range of potential data track positions.

According to a preferred approach, magnetic recording tapes may be stored in tape cartridges. Tape cartridges provide protection against damage to the tape, as well as a secure method of storing the tape, e.g., to prevent unraveling thereof when not in use. However, the various formats described herein may be correlated to the dimensions of the magnetic recording tape on which the data is stored and/or the dimensions of the corresponding tape cartridges. As a result, the tape cartridges themselves may have different formats. Therefore it is desirable for an apparatus to have a mechanism that is able to accept different tape cartridge formats.

Figure 10:
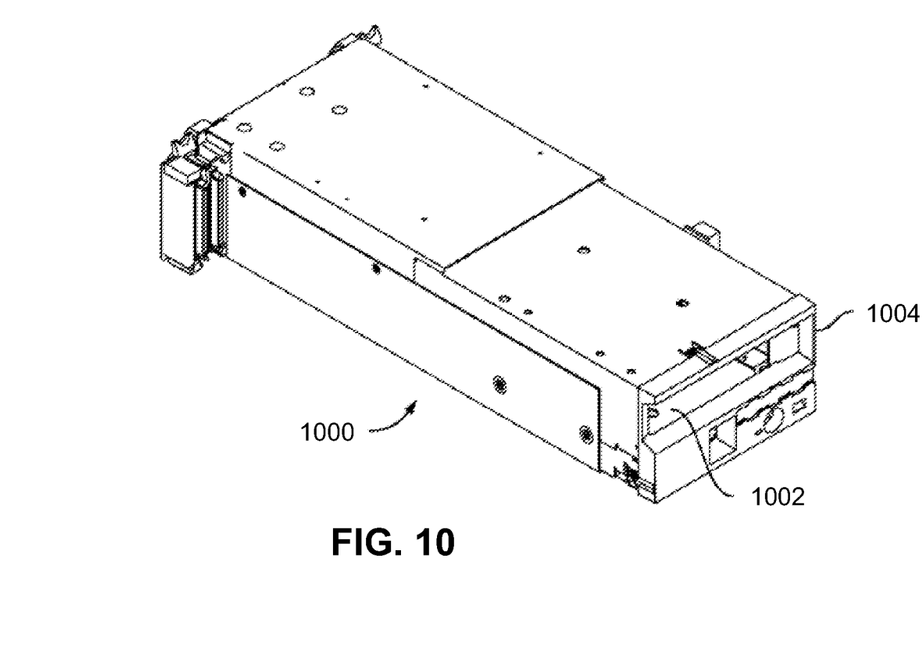
FIG. 10 is a side view of an apparatus according to one embodiment.

FIG. 10 depicts an apparatus 1000 in accordance with one embodiment, for reading data stored in various formats. As an option, the present apparatus 1000 may be implemented in conjunction with features from any other embodiment listed herein, such as those described with reference to the other FIGS. Of course, however, such apparatus 1000 and others presented herein may be used in various applications and/or in permutations which may or may not be specifically described in the illustrative embodiments listed herein. Further, the apparatus 1000 presented herein may be used in any desired environment.

Referring to FIG. 10, according to an exemplary embodiment, which is in no way intended to limit the invention, the apparatus 1000, may include a first mechanism 1002 for accepting tape cartridges in a first cartridge format and in a second cartridge format that is different than the first cartridge format and which would not be accepted by a drive configured to accept only the first cartridge format. Furthermore, the apparatus 1000 may further include a second mechanism 1004 for determining the cartridge format of a tape cartridge inserted in the apparatus. According to one approach, a single mechanism having the functionality of the first and second mechanisms may be used, however, in other approaches, the first and second mechanisms may be separate mechanisms, as shown.

According to one approach, the second mechanism may determine the cartridge format of a tape cartridge inserted in the apparatus by examining, e.g., reading, a portion of the cartridge. In another approach, format information for each tape cartridge in a system may be stored in cartridge memory, system memory, or any other type of memory known in the art, e.g., in a lookup table. Thus, in another approach, the second mechanism may determine the cartridge format of a tape cartridge inserted in the apparatus by identifying the tape cartridge and accessing the format information stored in the memory.

Referring again to FIG. 8, only the first, second and third modules 802, 804, 806 of the apparatus 800 are illustrated. The apparatus 800 may include only these modules. However, it should be noted that in various other embodiments, an apparatus may include at least four modules, at least five modules, multiple modules, etc., depending on the desired embodiment (e.g., see FIG. 9). Moreover, for apparatuses having a different number of modules than those illustrated in FIG. 8, each of the modules may also be configured to read data on a magnetic recording tape which none of the other modules are able to read.

For example, if one embodiment includes 5 modules, each of the 5 modules are preferably able to read at least one format that the other 4 modules are unable to read. However, according to yet another approach, an apparatus may include only two modules, where each of the two modules may be configured to read data in a respective first and second range of formats, each of which may include at least one format not included in the other range of formats.

Figure 9:
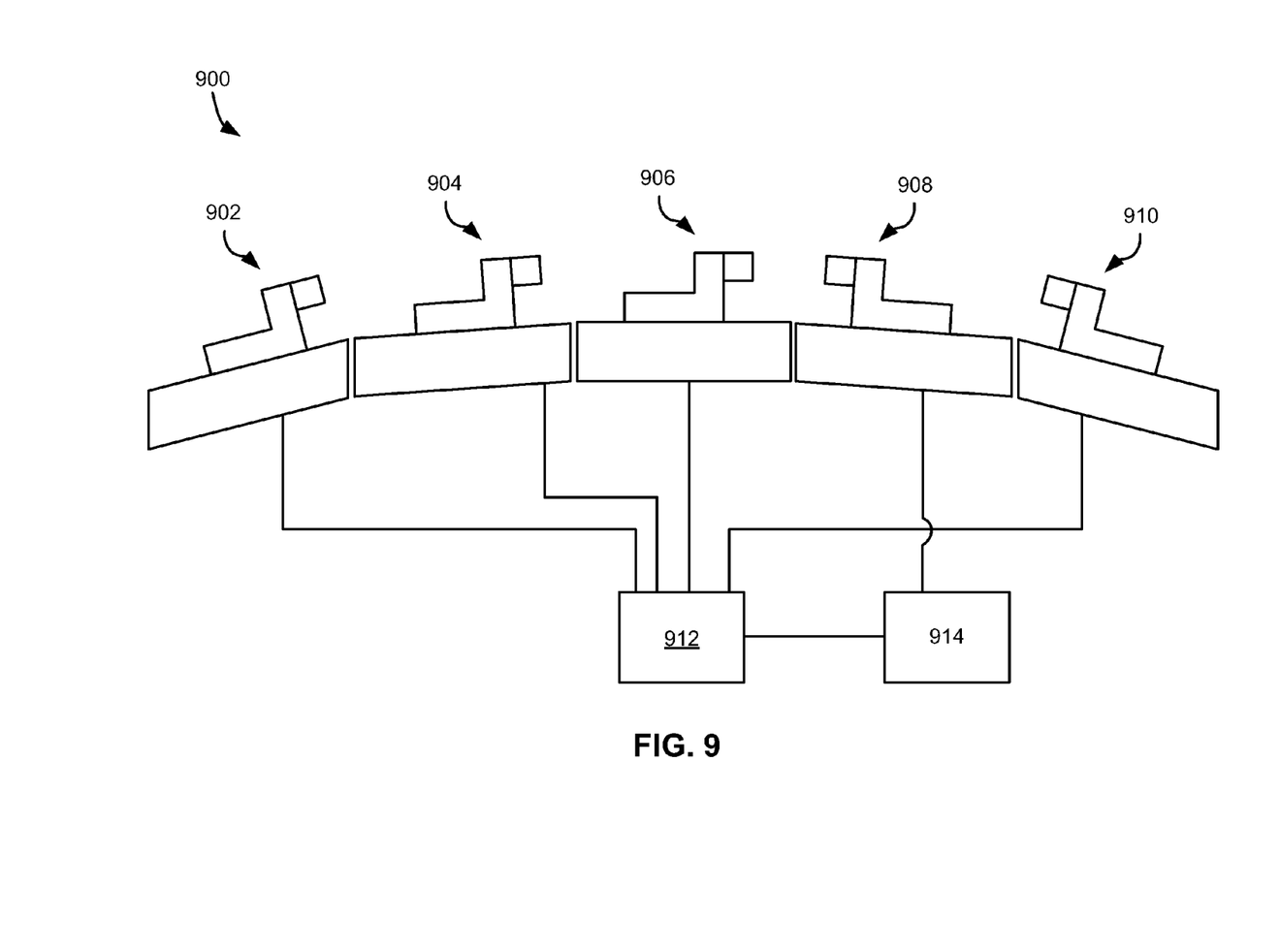
FIG. 9 is a side view of an apparatus having five modules according to one embodiment.

Looking now to FIG. 9, an apparatus 900 having five modules is illustrated in accordance with one embodiment. As an option, the present apparatus 900 may be implemented in conjunction with features from any other embodiment listed herein, such as those described with reference to the other FIGS. Of course, however, such apparatus 900 and others presented herein may be used in various applications and/or in permutations which may or may not be specifically described in the illustrative embodiments listed herein. Further, the apparatus 900 presented herein may be used in any desired environment. Thus FIG. 9 (and the other FIGS.) should be deemed to include any and all possible permutations.

With reference to FIG. 9, each of the modules 902, 904, 906, 908, 910 preferably includes an array of readers, e.g., according to any of the approaches described above with reference to FIG. 8. Thus, in a preferred approach, each of the modules 902, 904, 906, 908, 910 may have readers that are misaligned with a majority of readers of at least some of the other modules in the tape travel direction. As described above, this allows for the modules 902, 904, 906, 908, 910 to be capable of reading data from a wide range of potential data track positions.

Referring still to FIG. 9, the apparatus 900 also includes a multiplexer 912. As illustrated, some of the modules 902, 904, 906, 910 are shown as being coupled to the multiplexer 912, while one of the modules 908 is not, as will be discussed in further detail below. The multiplexer 912 may in turn be coupled to and controlled by a controller 914.

As described above, modules may be configured to read data stored in various magnetic recording tapes having different formats which, depending on the embodiment, may include a range of one or more formats. For embodiments having multiple modules, each configured to read data in only one format, it may be desirable to include a multiplexer 912. In a preferred approach, a multiplexer 912 may determine which one of the single format modules should be activated, e.g., depending on the format of a given tape to be read. However, in other approaches, the multiplexer 912 may activate two, at least two, multiple, etc. modules to attempt to read data from a magnetic recording tape.

According to an exemplary approach, the multiplexer 912 may be in communication with a device such as a mechanism or controller 914 for determining the format of a tape and/or cartridge inserted in the apparatus as described above. Thus, as the apparatus receives a tape cartridge and data is read by the modules, they may relay format information to the multiplexer 912. In turn, the mechanism may instruct the multiplexer to activate the appropriate module(s) to read the data stored on the tape in the tape cartridge.

According to various approaches, while one of the modules is activated to read from a tape, the other modules may remain in standby, in a low power state, off, etc. As a result, operating costs and/or power consumption may be desirably reduced, as only the desired number of modules are activated at a time, rather than having all the modules of a given apparatus activated while only one and/or a few of the modules are capable of reading the format from a given tape.

According to one example, which is in no way intended to limit the invention, the data on a tape may have been written in one format which may be read by the readers on a first module. However, over time, portions of the tape may experience aging (e.g., stretching, skew, etc.) to the point that a second module, corresponding to a different format than that in which the tape was originally written, may be required to read the portions of the tape that have been subjected to aging. Thus, according to the present example, the multiplexer 912 may activate both the first and second modules to read the aged tape.

According to another approach, one or more of the modules configured to read data in a range of multiple formats (e.g., greater than one format) may not be coupled to a multiplexer. Looking to the illustrative embodiment of FIG. 9, one of the modules 908 is configured to read data in a range of multiple formats; thus, although modules 902, 904, 906, 910 are shown as being coupled to the multiplexer 912, module 908 is instead coupled to the controller without traversing the multiplexer 912. In other embodiments, the apparatus may not include a multiplexer between the controller and the modules.

It will be clear that the various features of the foregoing systems and/or methodologies may be combined in any way, creating a plurality of combinations from the descriptions presented above.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as "logic," a "circuit," "module," or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a non-transitory computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the non-transitory computer readable storage medium include the following: a portable computer diskette, a hard disk, a random access memory (RAM), a read-only memory (ROM), an erasable programmable read-only memory (EPROM or Flash memory), a portable compact disc read-only memory (e.g., CD-ROM), a Blu-ray disc read-only memory (BD-ROM), an optical storage device, a magnetic storage device, or any suitable combination of the foregoing. In the context of this document, a non-transitory computer readable storage medium may be any tangible medium that is capable of containing, or storing a program or application for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a non-transitory computer readable storage medium and that can communicate, propagate, or transport a program for use by or in connection with an instruction execution system, apparatus, or device, such as an electrical connection having one or more wires, an optical fibre, etc.

Program code embodied on a computer readable medium may be transmitted using any appropriate medium, including but not limited to wireless, wireline, optical fibre cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer, for example through the Internet using an Internet Service Provider (ISP).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart(s) and/or block diagram block or blocks.

It will be further appreciated that embodiments of the present invention may be provided in the form of a service deployed on behalf of a customer.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. An apparatus, comprising:
a plurality of modules configured to at least read data stored on a magnetic recording tape, each of the modules having an array of readers;
wherein one module is configured to read data on a magnetic recording tape which none of the other modules can read;
an actuator for moving the plurality of modules as a single head unit,
a drive mechanism for passing a magnetic recording tape over the modules; and
a controller electrically coupled to the modules,
wherein the plurality of modules are fixed into a single head.

2. An apparatus as recited in claim 1, wherein another module is configured to read data on a magnetic recording tape which none of the other modules can read.

3. An apparatus as recited in claim 1, wherein the apparatus is not configured for writing.

4. An apparatus as recited in claim 1, further comprising a mechanism for accepting tape cartridges in a first cartridge format and in a second cartridge format that is different than the first cartridge format; and further comprising a mechanism for determining the cartridge format of a cartridge inserted in the apparatus.

5. An apparatus as recited in claim 1, wherein cross-track widths of readers closer to a middle of an array of the readers on at least one module are greater than widths of the readers relatively farther from the middle of the array.

6. An apparatus as recited in claim 1, wherein readers of a first of the modules are misaligned with a majority of readers of at least a second of the modules in a tape travel direction.

7. An apparatus as recited claim 1, wherein at least some of the modules are coupled to a multiplexer.

8. An apparatus as recited in claim 1, wherein one module has tunneling magnetoresistance data sensors, wherein another module has at least one of AMR and GMR data sensors.

9. An apparatus as recited in claim 1, wherein one module has at least one servo reader that is configured differently than a servo reader of at least another module.

10. An apparatus comprising:
a plurality of modules configured to at least read data stored on a magnetic recording tape, each of the modules having an array of readers;
wherein one module is configured to read data on a magnetic recording tape which none of the other modules can read; and
an actuator for moving the plurality of modules as a single head unit,
wherein the plurality of modules includes a first module configured to read data in a first range of formats, a second module configured to read data in a second range of formats, and a third module configured to read data in a third range of formats, the third range of formats encompassing at least one format not included in the first range of formats, the third range of formats encompassing at least one format not included in the second range of formats, the second range of formats encompassing at least one format not included in the first range of formats.

11. An apparatus as recited in claim 10, wherein only one first module is present in the apparatus, wherein only one second module is present in the apparatus, wherein only one third module is present in the apparatus.

12. An apparatus as recited in claim 10, wherein the apparatus is not configured for writing.

13. An apparatus, comprising:
a first module configured to at least read data stored on a magnetic recording tape in a first range of formats;
at least a second module configured to at least read data stored on a magnetic recording tape in at least a second range of formats; and
a third module configured to read data in a third range of formats,
wherein the first range of formats does not include a format that is in the second range of formats,
the third range of formats encompassing at least one format not included in the first range of formats,
the third range of formats encompassing at least one format not included in the second range of formats,
wherein all of the modules are aligned along, a tape travel direction.

14. An apparatus as recited in claim 13, wherein only one first module is present in the apparatus, wherein only one second module is present in the apparatus.

15. An apparatus as recited in claim 13, wherein the apparatus is not configured for writing.

16. An apparatus as recited in claim 13, further comprising a mechanism for accepting tape cartridges in a first cartridge format and in a second cartridge format that is different than the first cartridge format; and further comprising a mechanism for determining the cartridge format of a tape cartridge inserted in the apparatus.

17. An apparatus as recited in claim 13, wherein cross-track widths of readers closer to a middle of an array of the readers on at least one module are greater than widths of the readers relatively farther from the middle of the array.

18. An apparatus as recited in claim 13, further comprising:
a drive mechanism for passing a magnetic recording tape over the modules; and
a controller electrically coupled to the modules.

* * * * *